United States Patent
Byrne et al.

(10) Patent No.: US 7,346,565 B2
(45) Date of Patent: Mar. 18, 2008

(54) METHODS AND SYSTEMS FOR PERFORMING USAGE BASED BILLING

(75) Inventors: Stephen A. Byrne, Columbia, MO (US); Tony Van de Riet, Columbia, OH (US); Pam Weber, Independence, IA (US); Kevin Divine, Columbia, MO (US); Kathy Focazio, Ormond Beach, FL (US); Lauren Noble, Marion, IA (US)

(73) Assignee: General Electric Capital Corporation, Stamford, CT (US)

( * ) Notice: Subject to any disclaimer, the term of this patent is extended or adjusted under 35 U.S.C. 154(b) by 1059 days.

(21) Appl. No.: 09/681,391

(22) Filed: Mar. 28, 2001

(65) Prior Publication Data

US 2002/0143716 A1    Oct. 3, 2002

(51) Int. Cl.
*G07F 19/00*    (2006.01)
(52) U.S. Cl. ........................................... 705/34
(58) Field of Classification Search ............... 709/224, 709/203, 223; 358/1.15, 1.1, 1.13, 1.14; 705/1, 40, 32, 7, 8, 11, 52, 53, 75, 77, 34, 705/30, 24, 22; 710/18; 399/9, 10, 11, 12, 399/8, 13, 24, 31, 33; 714/46, 37, 49, 53, 714/100, 20, 48, 47, 42, 723
See application file for complete search history.

(56) References Cited

U.S. PATENT DOCUMENTS

| | | | |
|---|---|---|---|
| 5,084,875 A * | 1/1992 | Weinberger et al. | ......... 714/46 |
| 5,787,149 A * | 7/1998 | Yousefi et al. | ........... 455/422.1 |
| 5,864,484 A | 1/1999 | Harding | |
| 5,943,656 A | 8/1999 | Crooks et al. | |
| 5,956,505 A * | 9/1999 | Manduley | ...................... 713/1 |
| 5,963,925 A | 10/1999 | Kolling et al. | |
| 5,983,198 A | 11/1999 | Mowery et al. | |
| 6,021,401 A | 2/2000 | Oravetz et al. | |
| 6,035,285 A | 3/2000 | Schlect et al. | |
| 6,052,671 A | 4/2000 | Crooks et al. | |
| 6,078,785 A | 6/2000 | Bush | |
| 6,128,603 A | 10/2000 | Dent et al. | |
| 6,163,602 A | 12/2000 | Hammond et al. | |
| 6,182,022 B1 * | 1/2001 | Mayle et al. | ............... 702/182 |

(Continued)

FOREIGN PATENT DOCUMENTS

EP    0360511 A2 *    3/1990

*Primary Examiner*—Igor N. Borissov
(74) *Attorney, Agent, or Firm*—Armstrong Teasdale LLP

(57) ABSTRACT

Methods and systems for usage based billing are described. In one aspect, a method for operating a computer to facilitate the transmission, receipt and validation of meter data is described. An exemplary embodiment of the method includes the steps of transmitting meter data related to equipment usage, receiving the meter data and applying validation rules to the meter data, and generating an error report identifying meter data that violates at least one of the validation rules. The error report is exchanged with the dealer, for example via the Internet, to ensure accurate and correct data is used in generated invoices. The data correction is an iterative electronic process to facilitate timely and accurate invoicing. In another aspect, a method for operating a computer to facilitate the issuance of invoices and reconciling open payables records is described. An exemplary embodiment of the method includes the steps of generating invoices related to equipment usage, applying received payment to open invoices, and creating a payables data file.

36 Claims, 4 Drawing Sheets

U.S. PATENT DOCUMENTS

| | | |
|---|---|---|
| 6,240,167 B1 | 5/2001 | Michaels |
| 6,249,905 B1 | 6/2001 | Yoshida et al. |
| 6,266,401 B1 | 7/2001 | Marchbanks et al. |
| 6,393,380 B1 * | 5/2002 | Zemlo ........................ 702/188 |
| 6,665,085 B1 * | 12/2003 | Edmunds et al. .......... 358/1.15 |
| 6,832,250 B1 * | 12/2004 | Coons et al. ................ 709/224 |
| 6,882,986 B1 * | 4/2005 | Heinemann et al. .......... 705/40 |
| 2002/0010666 A1 * | 1/2002 | Wright ........................ 705/34 |
| 2002/0083003 A1 * | 6/2002 | Halliday et al. ............... 705/52 |
| 2006/0178918 A1 * | 8/2006 | Mikurak ........................ 705/7 |

* cited by examiner

METHODS AND SYSTEMS FOR PERFORMING USAGE BASED BILLING

BACKGROUND OF INVENTION

This invention relates generally to usage based billing products and services and more particularly, to timely and accurate electronic transmission, management and corroboration of usage based billing and accounting information between multiple parties.

Manufacturers and dealers sometimes provide equipment to end users and charge the end users a fee based on the extent to which the equipment is used. Such an arrangement, sometimes referred to as usage based billing, is advantageous for an end user since the expense of purchasing the equipment is avoided and service and maintenance of the equipment is usually included in the fee.

For example, office technology dealers sometimes provide a customer with equipment for business use and the customer is charged based on the customer's use of the equipment. With photocopiers, for example, the customer is billed based on the number of photocopies produced by the machines during the billing period. As an example, a customer may be billed $500 per month for a pre-set number of copies. The cost of equipment, service and maintenance is usually included in such payment. If the customer makes more than the pre-set number of copies in any given month, then the customer is also billed a per copy charge for each copy made in excess of the pre-set number of copies to cover the incremental cost of service and maintenance.

With respect to equipment supplied to customers on a usage based billing arrangement, the dealer often may secure financing from a financial institution. For example, the usage based lease entered into with the customer, the leased equipment and the equipment rental portion of each payment may be assigned to the financial institution. While the dealer collects or otherwise obtains information related to the monthly usage of the equipment, the financial institution is usually responsible for billing and collecting the payments from the customer. The dealer typically remains responsible for service and maintenance, and the cost of such service and maintenance is usually included in the amount billed by the financial institution to the customer. Therefore, the financial institution not only bills and collects from the customer, but also remits to the dealer that portion of each payment attributable to service and maintenance and excess usage charges.

To accurately determine the amount to be billed to a customer, information relating to the extent to which the equipment was used during the billing period is obtained. For photocopiers, for example, a meter coupled to each photocopier counts the number of photocopies made at each machine. The meter data is then collected and supplied to, for example, the dealer. If a dealer has many customers, and each customer has many photocopiers, simply collecting the meter data for each photocopier is a time consuming and tedious task.

Once the meter data is collected, the dealer then transmits the data to the financial institution. Reviewing the meter data, calculating the amount due for use of each photocopier, consolidating the data for each customer, and then sending a bill to each customer also is time consuming and tedious.

Further, since the amount billed for each photocopier is based on the number of copies made at each photocopier, the accuracy of the bills is dependent upon ensuring that the meter data has been correctly collected, entered, and processed. With multiple photocopiers and multiple customers, ensuring that the meter data has been correctly collected, entered, and processed is time consuming and tedious.

Once a customer has received a proper bill and submits payment to the financial institution, the financial institution then remits the agreed upon portion of the payment to the servicing dealer to cover the dealer's service and maintenance charges. Both the dealer and the financial institution also apply the money received to their respective open accounts receivables. Due to the high volume of data, the complexity associated with having the meter data collected by the dealer and relied upon by the financial institution to correctly bill and collect payments due and payable by the customer in a timely manner, and the combination of the service and maintenance charges with the excess usage charges, simply ensuring that each dealer receives the proper payment and that the payments are applied to the proper accounts is a complex task. Such complexity adds to the administrative cost of usage based billing arrangements.

SUMMARY OF INVENTION

In one aspect, a method for operating a computer to facilitate receipt and validation of meter data is described. An exemplary embodiment of the method includes the steps of receiving meter data related to equipment usage, applying validation rules to the meter data, and generating an error report identifying meter data that violates at least one of the validation rules.

In another aspect, a method for operating a computer to facilitate correction of meter data is described. An exemplary embodiment of the method includes the steps of receiving meter data and storing the data in a database, applying validation rules to the received meter data, associating an error identifier with each data entry that violates a validation rule, and storing, in the database, the error identifier and associated data entry. The method further includes, for example, generating a meter correction report identifying the data that violates a validation rule and providing that a dealer can enter updates, or corrections, directly in the meter correction report so that the data stored in the database can be corrected from the report entries.

In yet another aspect, a method for operating a computer to facilitate the issuance of invoices and reconciling open payables records is described. An exemplary embodiment of the method includes the steps of generating invoices related to equipment usage, applying received payment to open invoices, and creating a payables data file. The payables data file includes at least one of check number, check amount, payment detail by asset, service payment breakdown by base service and overage charges, dealer invoice number and customer name.

In still another aspect, a database for use in a usage based billing system is described. The database, in an exemplary embodiment, includes an export data file containing at least one of asset serial number, model number, meter reading date, an invoice number, amount of receivable, customer name, coverage begin date, coverage end date, and service credits. The database further includes a payables data file having at least one of check number, check amount, payment detail by asset, service payment breakdown by base service and overage charges, dealer invoice number, bill to number and customer name. The payables file also includes a header record that identifies which data elements should be used by the OMD Task 1Y to match the data in the payables data file to the dealer's payable data in the OMD software. Validation rules also are contained within the database.

DETAILED DESCRIPTION

Although embodiments of the meter data process and payable data process sometimes are described herein in the context of photocopiers, such processes are not limited to practice with photocopiers. Such processes can be used in connection with many other types of office technology, as well as non-office related technology. Therefore, the description of the processes in the context of photocopiers is by way of example only and such processes can be utilized in many other contexts as well.

Figure 1:
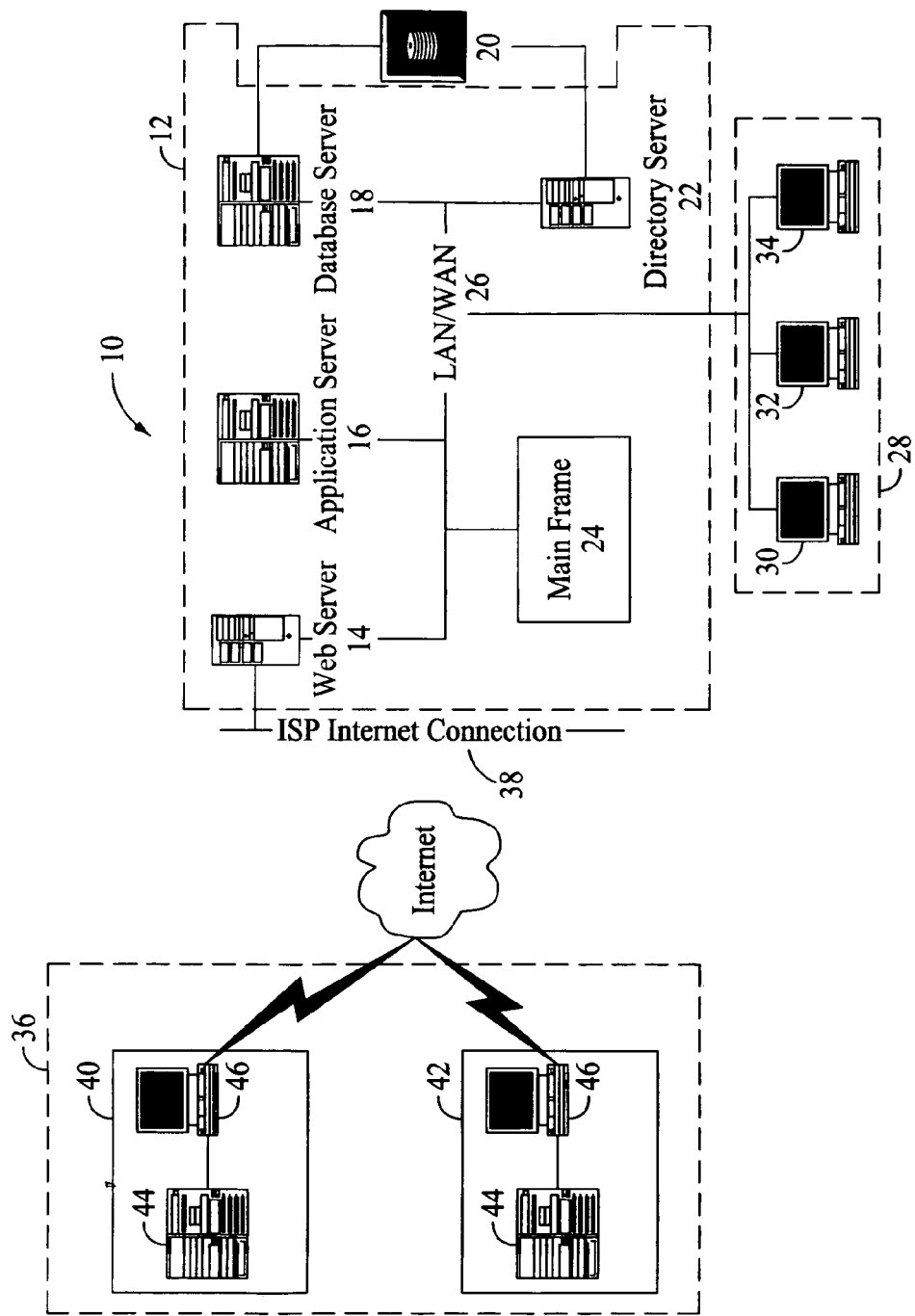
FIG. 1 is a block diagram of a network based system.

FIG. 1 is a block diagram of a network based system 10. System 10 includes server sub-system 12 that includes a web server 14, an application server 16, a database server 18, a disk memory storage 20, a directory server 22, and a main frame 24 coupled via a network 26, which may be a local area network or a wide area network. Database server 18 incorporates a database such as an Oracle based database, commercially available from Oracle Corporation, 500 Oracle Parkway, Redwood City, Calif., 94065.

Multiple work stations 28, such as work stations 30, 32, and 34 are coupled to server-subsystem 12 via network 26. Each work station 30, 32, and 34 is, for example, a personal computer and multiple functions, as described below in more detail, can be performed at each work station 30, 32, and 34. For example, system administration, billing initiation and coordination, and error correction tasks can be performed at work stations 28.

Server sub-system 12 also is communicatively coupled to dealers 36 via an ISP Internet connection 38. The communication in the exemplary embodiment is illustrated as being performed via the Internet, however, any other wide area network (WAN) type communication can be utilized in other embodiments, i.e., the systems and processes are not limited to being practiced via the Internet. Of course, multiple dealers 40 and 42 can communicate with server sub-system 12. Each dealer 40 and 42, in the exemplary embodiment, has a server 44 for performing meter data administration functions and a personal computer 46 coupled to server 44.

In the exemplary embodiment, server 44 hosts the OMD software commercially available from OMD Corporation, 3705 Missouri Boulevard, Jefferson City, Mo. 65102. The OMD software performs administrative functions for usage based billing applications. In the exemplary embodiment, a dealer 40 can access server sub-system 12 via Internet connection 38 and perform tasks as described below in detail. Personal computer 46, in the exemplary embodiment, operates a Windows based operating system.

Although the processes described below are sometimes described herein in the context of system 10, such processes can be practiced using many different systems having different architectures and components. Therefore, the processes are not limited to practice in connection with system 10 and the description below is exemplary only.

Figure 2:
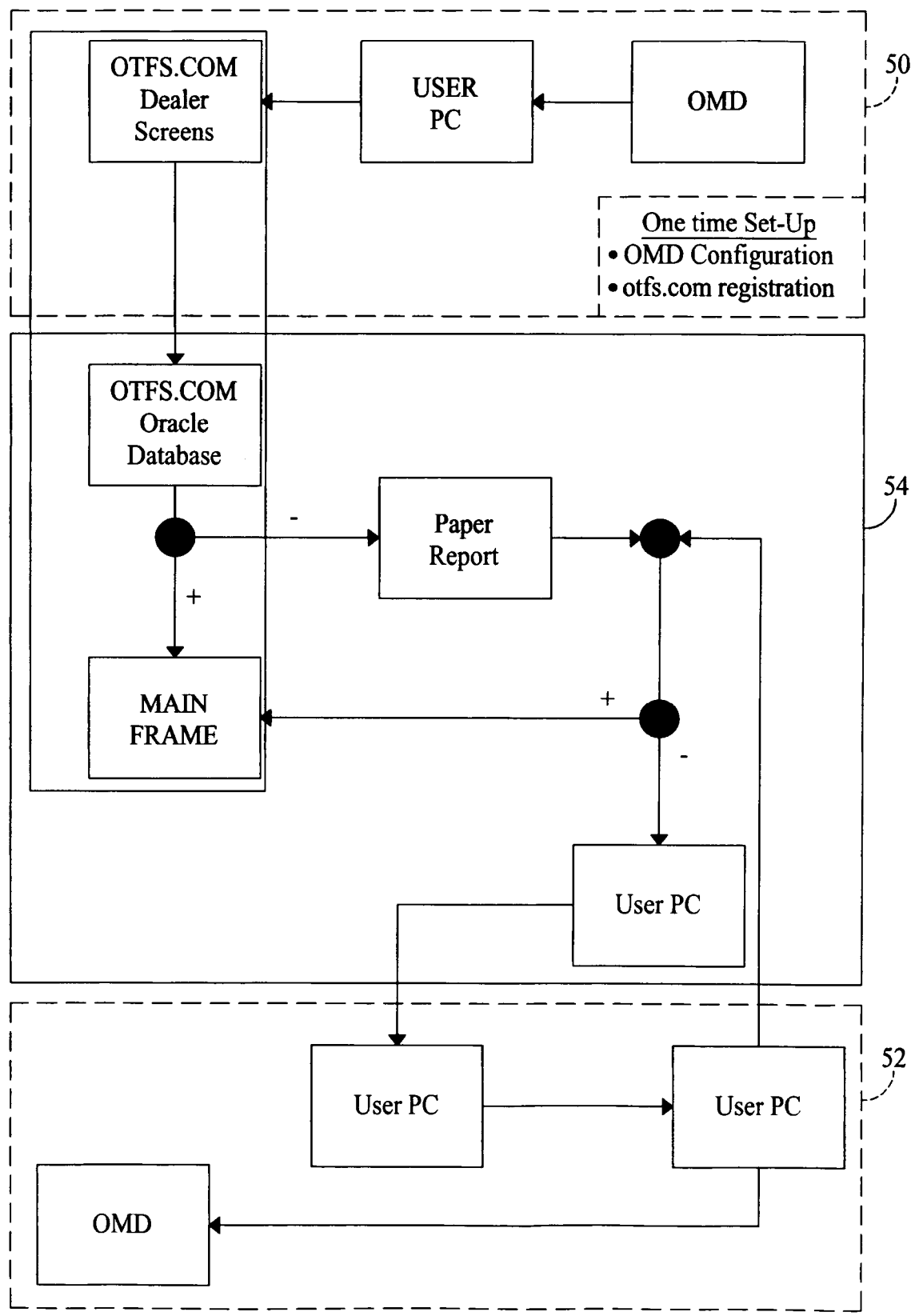
FIG. 2 is a data flow diagram for a meter data process.

FIG. 2 is a block diagram of one embodiment of a meter data process. The process steps illustrated in blocks 50 and 52 typically are performed by a dealer, and the process steps illustrated in block 54 typically are performed by a financial institution that has purchased the equipment lease portion of the contract with the end user. The financial institution receives its payments based on usage of the equipment by an end user. Of course, if a dealer has not sold or contracted for the services identified in block 54, then such processing would be performed by the dealer rather than a separate entity.

Referring now specifically to FIG. 2, meter data is collected by the dealer and input into OMD software application residing on server 44. Again, the OMD software performs dealer distribution management tasks. Using the OMD software, the dealer inputs meter data and runs a task in the OMD software that generates an export file containing the meter data. The export file contains meter data, asset serial number, model number, meter reading date, an invoice number, an amount of the receivables, customer name, coverage begin date, coverage end date, and service credits. The dealer then copies the export file from the OMD environment into the Windows environment of personal computer 46.

More specifically, once the export file is copied into computer 44, the dealer accesses system 10, e.g., via a web site. Access to system 10 is controlled, for example, using authorized user names and passwords. Once the dealer enters an authorized user name and password, the dealer then has access to server subsystem 12 and transmits the export file to the Oracle database. The data file format is validated by system 10 and the data fields are checked for null values. Once the data is accepted, a header record is created to identify the file sender and number of records. Also, once the data is accepted, the dealer receives confirmation, e.g., via the web site, such as: Your file was successfully transmitted. We received XX records in your file. Our Usage Billing System will be processing your file. If during that process any errors are encountered, we will contact you.

A data validation routine is then executed, e.g., by main frame 24, to validate each data record of each transmitted file. The routine uses the following rules to validate the data: asset or serial number not found; serial number or serial number/model number are not unique; the account is not active; current meter date is not a valid date; current meter date is more than 30 days ago; current meter date is less than previous meter date; current meter date must be within 2-5 days of the expected meter date; invalid current meter reading (i.e., not numeric); current meter reading less than previous meter reading; dealer provided meter credits; calculated overage charges by dealer does not equal preset amount; excess amount is greater than $1500; if consolidated account, all assets readings not received in file; duplicate readings. Each data record that passes all validation rules is then automatically processed in the mainframe system for invoicing the lessee for the service payment.

More specifically, exemplary validation rules are set forth below.

Serial Number—not found in mainframeSerial Number duplicate found in mainframeMeter Read duplicate meter read found in data fileAccount Schedule status not ActiveSerial Number has more than one meter assignedcurrent Meter Read Date—invalid data formatCurrent Meter Read Date>current system dateCurrent Meter Read Date>30 days agocurrent Meter Read Date<previous meter read dateCurrent Meter Read Date—not within range of expected next read dateCurrent Meter Read<previous meter read or invalid data formatMeter Service Credits>0Excess Usage Charge>$1500 Next Invoice Due Date>2 months from current system dateSerial Number invalid data formatMeter Read duplicate found in mainframeConsolidated Meter Account all meter reads not received in data fileAccount Schedule duplicate record for the same account schedule-Consolidated Meter Account one or more readings in error-Excess Usage Charge—not equal to mainframe calculated chargeAccount Schedule The financial institution does not do the billingData records that do not meet any one of the validation rules are rejected. The rejected data records and the reason for each failure are printed to an Error Report by Dealer. Each rejected data record is to be reviewed to determine if the reject was caused by an internal error that is not caused by invalid dealer data. For example, validation rules reject any data record when a duplicate serial number is found in the system. This validation rule ensures the meter is not applied to the wrong asset. Since the dealer serial number is correct, no action is needed by the dealer. Rejected data identified as internal errors is manually entered into the mainframe system for invoicing.

Each rejected data record not identified as an internal error is considered to be a Dealer error. For example, validation rules reject any data record when a current meter reading is less than the previous meter reading found in the system. This validation rule identifies that an incorrect meter reading has been provided by the dealer. Rejected data identified as dealer errors and the reason for the error is transferred to an Excel-based meter correction worksheet. The meter correction worksheet is e-mailed, e.g., via web server 14, to the dealer with expectation that the dealer will review the errors and input corrections and comments to the worksheet.

The dealer receives the worksheet, reviews the errors and inputs the corrections and comments directly to the worksheet. The dealer manually updates the OMD software with the corrections, and e-mails the updated meter correction worksheet back to system 12 for processing.

Figure 3:
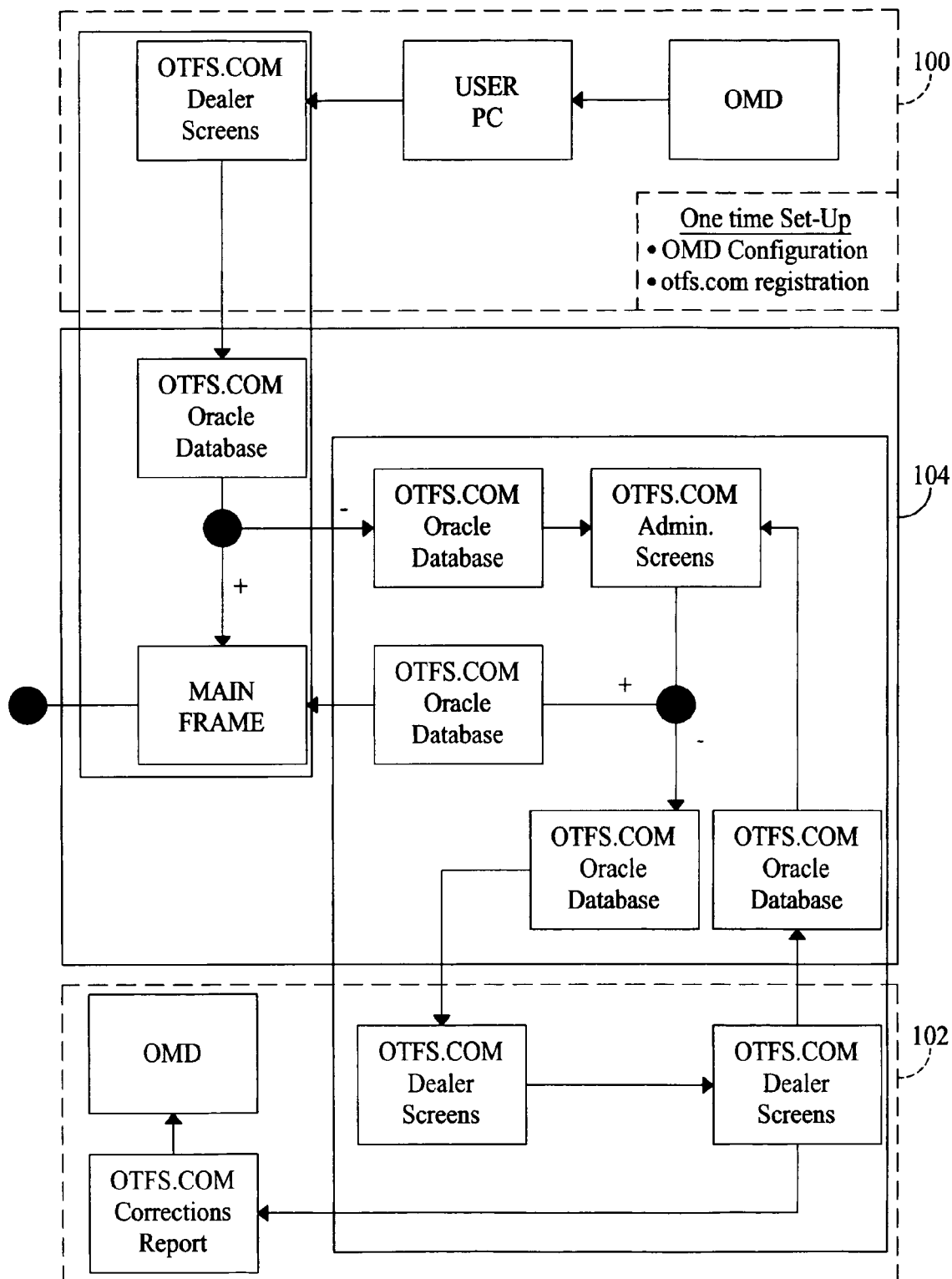
FIG. 3 is a data flow diagram for another embodiment of a meter data process.

FIG. 3 is a block diagram of another embodiment of a meter data process. The process steps illustrated in block 100 and 102 typically are performed by a dealer, and the process steps illustrated in block 104 typically are performed by a financial institution that has purchased the equipment lease portion of the contract with the end user. If a dealer has not sold or contracted for the services identified in block 104, then such processing would be performed by the dealer rather than a separate entity.

The process illustrated in FIG. 2 automates the reporting of meter data and validation of the data. In addition, the validated data is stored in the mainframe in a format readily usable for billing purposes. Of course, additional processes can be used in combination with the process illustrated in FIG. 2. In addition, correction of error data also can be automated to further facilitate more timely and accurate billing. One such automated process is illustrated in FIG. 3.

Referring now specifically to FIG. 3, meter data is collected by the dealer and input into server 44. Using the OMD software, the dealer inputs meter data and runs a task in the OMD software application that generates an export file containing the meter data. The export file contains meter data, asset serial number, model number, meter reading date, an invoice number, an amount of the receivables, customer name, coverage begin date, coverage end date, and service credits. The dealer then copies the export file from the OMD environment into the Windows environment of personal computer 46.

More specifically, once the export file is copied into computer 44, the dealer accesses system 12, e.g., via a web site. Access to system 12 is controlled, for example, using authorized user names and passwords. Once the dealer enters an authorized user name and password, the dealer then has access to server subsystem 12 and transmits the export file to the Oracle database. The data file format is validated by system 10 and the data fields are checked for null values. Once the data is accepted, a header record is created to identify the file sender and number of records. Also, once the data is accepted, the dealer receives confirmation, e.g., via the web site, such as: Your file was successfully transmitted. We received XX records in your file. Our Usage Billing System will be processing your file. If during that process any errors are encountered, we will contact you.

A data validation routine is run by main frame 24 to validate each data record of each file. The routine uses the rules described above in connection with FIG. 2 to validate the data. Each data record that passes all validation rules is then processed in the main frame system for invoicing the lessee for the service payment.

An error correction process is then initiated. Specifically, data records that do not meet any one of the validation rules are rejected, and an error identifier is associated with each data entry that violates a validation rule. That is, each data entry that violates a validation rule is flagged in the Oracle database and the reason for the reject is associated with the data record.

Data records that have been rejected, however, still should be processed. Web-based administration screens allow personnel access to the rejected data records, and each rejected data record is reviewed to determine if the reject was caused by an internal error that is not caused by invalid dealer data. For example, validation rules reject any data record when a duplicate serial number is found in the system. This validation rule ensures the meter reading is not applied to the wrong asset. Since the dealer's serial number is correct, no action is needed by the dealer. The administrator identifies the correct account schedule and serial number to associate with each data record. Rejected data identified as being rejected due to internal errors is released by flagging in the Oracle database.

Each rejected data record not identified as an internal error is considered to be a Dealer error. For example, validation rules reject any data record when a current meter reading is less than the previous meter reading found in the system. This validation rule indicates that an incorrect meter reading has been provided by the dealer.

Rejected data identified as dealer errors is released by flagging in the Oracle database. Data records flagged as Dealer errors are released to the meter correction report which is accessible by the dealer via the Internet, e.g., a web site. Also, by referencing the header record for the data file, an e-mail notification is automatically sent to the dealer alerting the dealer that corrections are waiting for input.

The dealer accesses the meter correction report in system 12 via, for example, a web site. Specifically, a home page is designated through which the dealer can log into system 12. Once logged into system 12 via the web site, the dealer can access the meter correction report.

The meter correction report lists all of the rejected data records, a brief explanation of the reason the record was rejected, a suggested list of possible corrective actions which the dealer may select, and the file name and date the record was sent. The dealer can download and print the report. Once the dealer has researched the rejected records, the dealer enters updated information and comments directly into the meter correction report. Once the dealer completes all data entry, the dealer selects a Send Corrections button to save the data to the Oracle database.

Prior to exiting the application, the dealer is prompted as to whether the dealer wants to print the meter corrections report. The dealer can use the report to manually update the dealer OMD software with the corrections. The corrections that are saved to the Oracle database populate into the web-based administration screens used by personnel to review and release data records for processing.

The processes described above facilitate ensuring that meter data is validated and in a format readily usable for billing purposes. Set forth below is a description of an exemplary process for using such stored data in a payables data process.

Figure 4:
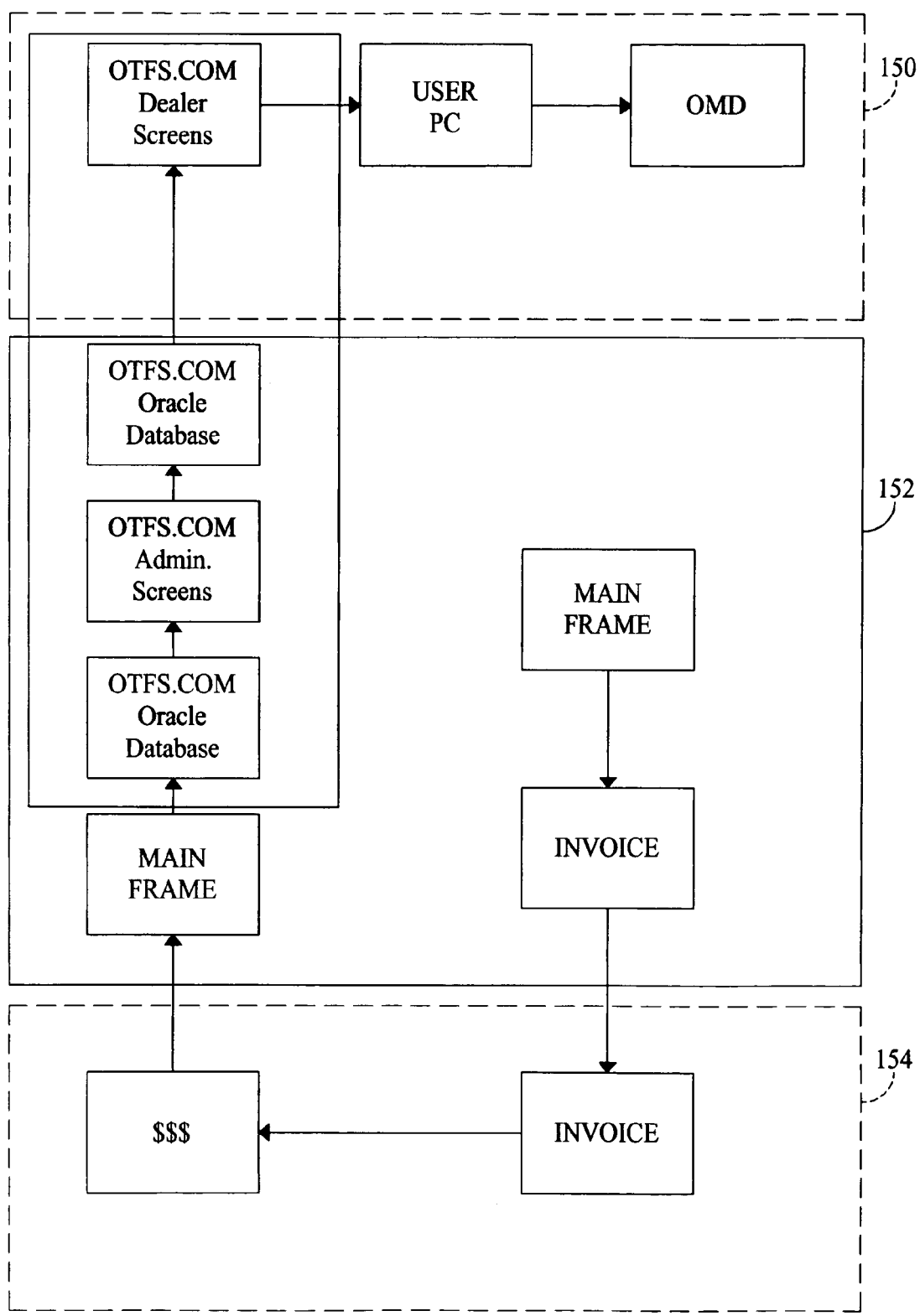
FIG. 4 is a data flow diagram for payables data process.

More specifically, FIG. 4 is a data flow diagram for a payables data process. The processes illustrated in block 150 typically are performed by the entity which purchased the leased equipment and assumed the obligation to bill the customer for usage based charges. The processes illustrated in block 152 typically are performed by an entity that has purchased the equipment lease usage payment. The processes illustrated in block 154 typically are performed by a customer. Of course, the processes illustrated in FIG. 4 could be performed by any appropriate individual or entity, and the description of such processing as set forth herein is exemplary only.

Referring specifically to FIG. 4, once meter reading data records have been accepted for invoicing, the mainframe system creates invoices for the dealers service payments. Hard copies of the invoices are mailed to the customers. The customer receives the invoice and makes payment to the financing entity. The customer mails the payment directly to the financing entity.

The financing entity receives the customer payment and applies the cash to open receivables, which triggers opening payables to the dealer for service payments. Once customer payments have been applied and the payment is forwarded to the dealer for service payments due, then a mainframe application is run to create a payables data file. The file includes all of the payment information the dealer needs to apply cash to the open receivables, e.g., check number, check amount, payment detail by asset, service payment breakdown by base service and overage charges, dealer invoice number, bill to number and customer name. The payables file also includes a header record that identifies which data elements should be used by the OMD Task 1Y to match the data in the payables data file to the dealer's payable data in the OMD software. The payables data file is electronically transmitted to the Oracle database.

The payables data file represents payment information associated with the checks sent to the dealers. The checks are generated, for example, weekly. A percentage, e.g., 3%, of the checks may require modification to the payment information associated with the check. Therefore, the payment data is modified prior to releasing it to the dealer. Web-based administration screens allow personnel access to the payment information.

The administration screens allow personnel to access the payment information, review each data record, flag each record for release, or hold and then edit any of the held records prior to releasing. Once released, the data records are made available to populate the payables report. The payables report is used by each dealer to apply cash to open receivables in the OMD software.

The dealer accesses the payables report via the web site. Once logged on to the web site, the dealer can access the payables report to view payables information associated with the check received. The payables report allows the dealer to view information by invoice number, customer name, or date range. The dealer also can download the payables data file. The payables data file also is electronically transferred to the dealer computer.

The dealer uses the payables data to apply cash against open receivables within the OMD software. For example, the OMD software includes a program, i.e., Task 1Y, which automatically applies the cash. The OMD program attempts to match the dealer open receivable against the data provided in the file. The program is able to match on either one or a combination of the following data fields: "Serial number/Model number", "Bill To", "Ship To", "Invoice Number", "Invoice Date" and/or "Coverage Begin Date". The payables file downloaded from the web site includes a header record that directs the OMD Task 1Y to match the payables data to the Dealer's open receivables by "Bill To" and "Invoice Number". For data records that do not match, the OMD program provides information as to why the record was not matched.

The payables data process facilitates issuance of invoices, and well as payment of invoices and applying such payments to open accounts receivable to reconcile billing records. Such process also facilitates ensuring that the appropriate payments are received by the various entities involved including the financial institutions as well as the dealers.

While the invention has been described in terms of various specific embodiments, those skilled in the art will recognize that the invention can be practiced with modification within the spirit and scope of the claims.

The invention claimed is:

1. A method for performing usage-based billing for a business entity using a local computer system coupled to a database and a remote computer system, the business entity having customers subscribing to a usage-based billing program, said method comprising the steps of:

inputting into the remote computer system meter data relating to equipment usage by one of the customers, the meter data including at least one of an amount of usage of a piece of equipment, equipment serial number, model number, meter reading date, and customer name;

generating an export file by processing the meter data at the remote computer system, the export file including a plurality of data records;

transmitting the export file from the remote computer system to the local computer system for storing within the database;

applying validation rules to the export file at the local computer system to determine the data records included within the export file that satisfy the validation rules, wherein one of the applied validation rules determines whether data representing an amount of usage of a piece of equipment included within the corresponding export file is invalid;

generating an error report identifying the data records included within the export file that violate at least one of the validation rules including identifying data records that violate at least one of the validation rules due to at least one of a processing error at the local computer system and an inputting error at the remote computer system;

generating at the local computer a correction report including a list of all the data records listed on the error report, a corresponding reason for the data record to be listed on the error report, and a list of possible corrective actions to correct the data record for satisfying the validation rules;

correcting each data record listed on the error report such that each data record listed on the error report satisfies the validation rules;

generating a corrected export file including the corrected data records; and transmitting an invoice for payment by the customer for usage of the piece of equipment based on the corrected export file.

2. A method according to claim 1 wherein the meter data is received in a predefined format.

3. A method according to claim 2 wherein the meter data is contained in an export file containing at least one of asset serial number, model number, meter reading date, an invoice number, amount of receivable, customer name, coverage begin date, coverage end date, and service credits.

4. A method according to claim 1 wherein the meter data is inputted into the remote computer system via the Internet.

5. A method according to claim 1 wherein the validation rules comprise at least one of asset or serial number not found; serial number or serial number/model number are not unique; the account is not active; current meter date is not a valid date; current meter date is more than 30 days ago; current meter date is less than previous meter date; current meter date must be within 2-5 days of the "expected" meter date; invalid current meter reading; current meter reading less than previous meter reading; dealer provide meter credits; calculated overage charges by dealer does not equal preset amount; excess amount is greater than $1500; if consolidated account, all assets readings not received in file; duplicate readings.

6. A method according to claim 1 further comprising automatically correcting at the local computer the data records identified as processing errors.

7. A method according to claim 6 further comprising the step of automatically transmitting a data file including the data records identified as input errors to the remote computer system for correction.

8. A method according to claim 1 further comprising the step of providing that the error report is accessible via a web site and notifying a dealer that corrections are awaiting input.

9. A method according to claim 8 wherein the error report lists rejected data records, an explanation of the reason the record was rejected, and the file name and date the record was sent.

10. A computer for performing usage-based billing for a business entity having customers subscribing to a usage-based billing program, the computer comprising a processor in communication with a database, said computer programmed to:

receive meter data relating to equipment usage by one of the customers, the meter data including at least one of an amount of usage of a piece of equipment, equipment serial number, model number, meter reading date, and customer name;

generate an export file by processing the meter data, the export file including a plurality of data records;

store the export file within the database;

apply validation rules to the export file to determine the data records included within the export file that satisfy the validation rules, wherein one of the applied validation rules determines whether data representing an amount of usage of a piece of equipment included within the corresponding export file is invalid;

generate an error report identifying the data records included within the export file that violate at least one of the validation rules including identifying data records that violate at least one of the validation rules due to at least one of a processing error and an inputting error;

generate a correction report including a list of all the data records listed on the error report, a corresponding reason for the data record to be listed on the error report, and a list of possible corrective actions to correct the data record for satisfying the validation rules;

prompt a user associated with the business entity to correct each data record listed on the error report such that each data record listed on the error report satisfies the validation rules;

generate a corrected export file including the corrected data records; and transmit an invoice for payment by the customer for usage of the piece of equipment based on the corrected export file.

11. A computer according to claim 10 wherein the meter data is contained in an export file containing at least one of asset serial number, model number, meter reading date, an invoice number, amount of receivable, customer name, coverage begin date, coverage end date, and service credits.

12. A computer according to claim 10 wherein the validation rules comprise at least one of asset or serial number not found; serial number or serial number/model number are not unique; the account is not active; current meter date is not a valid date; current meter date is more than 30 days ago; current meter date is less than previous meter date; current meter date must be within 2-5 days of the "expected" meter date; invalid current meter reading; current meter reading less than previous meter reading; dealer provide meter credits; calculated overage charges by dealer does not equal preset amount; excess amount is greater than $1500; if consolidated account, all assets readings not received in file; duplicate readings; wherein each data record that passes all validation rules is then processed in the mainframe system for invoicing the lessee for the service payment.

13. A computer according to claim 10 further programmed to automatically correct the data records identified as processing errors.

14. A computer according to claim 10 further programmed to automatically transmit a data file including the data records identified as input errors to a remote computer system for correction.

15. A computer according to claim 10 further programmed to:

generate invoices related to equipment usage;

apply received payment to open invoices; and create a payables data file, said file comprising at least one of check number, check amount, payment detail by asset, service payment breakdown by base service and overage charges, dealer invoice number and customer name.

16. A system for performing usage-based billing for a business entity having customers subscribing to a usage-based billing program, said system comprising:

a client system comprising a browser, the client system configured to:

receive meter data relating to equipment usage by one of the customers including at least one of an amount of usage of a piece of equipment, equipment serial number, model number, meter reading date, and customer name, and generate an export file by processing the meter data, the export file including a plurality of data records;

a database for storing information; and a server configured to be coupled to the client system and the database, the server system further configured to:

receive the export file from the client system;

apply validation rules to the export file to determine the data records included within the export file that satisfy the validation rules, wherein one of the applied validation rules determines whether data representing an amount of usage of a piece of equipment included within the corresponding export file is invalid;

generate an error report identifying the data records included within the export file that violate at least one of the validation rules including identifying data records that violate at least one of the validation rules due to at least one of a processing error at the server system and an input error at the client system;

generate a correction report including a list of all the data records listed on the error report, a corresponding reason for the data record to be listed on the error report, and a list of possible corrective actions to correct the data record for satisfying the validation rules;

prompt a user associated with the business entity to correct each data record listed on the error report such that each data record listed on the error report satisfies the validation rules;

generate a corrected export file including the corrected data records; and transmit an invoice for payment by the customer for usage of the piece of equipment based on the corrected export file.

17. A system according to claim 16 wherein said database further comprises validation rules comprising at least one of asset or serial number not found; serial number or serial number/model number are not unique; the account is not active; current meter date is not a valid date; current meter date is more than 30 days ago; current meter date is less than previous meter date; current meter date must be within 2-5 days of the "expected" meter date; invalid current meter reading; current meter reading less than previous meter reading; dealer provide meter credits; calculated overage charges by dealer does not equal preset amount; excess amount is greater than $1500; if consolidated account, all assets readings not received in file; duplicate readings.

18. A system according to claim 16 wherein the error report is accessible via a web site for prompting a dealer that corrections are awaiting input.

19. A system according to claim 16 wherein the sewer system is further configured to automatically correct the data records identified as processing errors.

20. A system according to claim 16 wherein said server is further configured to automatically transmit a data file including the data records identified as input errors to the client system for correction.

21. A system according to claim 16 wherein said server is further configured to:

generate invoices related to equipment usage;

apply received payment to open invoices; and create a payables data file, said file comprising at least one of check number, check amount, payment detail by asset, service payment breakdown by base service and overage charges, dealer invoice number and customer name.

22. Apparatus for performing usage-based billing for a business entity having customers subscribing to a usage-based billing program, said apparatus comprising:

means for receiving meter data relating to equipment usage by one of the customers, the meter data including at least one of an amount of usage of a piece of equipment, equipment serial number, model number, meter reading date, and customer name;

means for generating an export file by processing the meter data, the export file including a plurality of data records;

means for applying validation rules to the export file to determine the data records included within the export file that satisfy the validation rules, wherein one of the applied validation rules determines whether data representing an amount of usage of a piece of equipment included within the corresponding export file is invalid;

means for generating an error report identifying the data records included within the export file that violate at least one of the validation rules including identifying data records that violate at least one of the validation rules due to at least one of a processing error and an inputting error;

means for generating a correction report including a list of all the data records listed on the error report, a corresponding reason for the data record to be listed on the error report, and a list of possible corrective actions to correct the data record for satisfying the validation rules;

means for prompting a user associated with the business entity to correct each data record listed on the error report such that each data record listed on the error report satisfies the validation rules;

means for generating a corrected export file including the corrected data records; and means for transmitting an invoice for payment by the customer for usage of the piece of equipment based on the corrected export file.

23. Apparatus according to claim 22 wherein the meter data is contained in an export file containing at least one of asset serial number, model number, meter reading date, an invoice number, amount of receivable, customer name, coverage begin date, coverage end date, and service credits.

24. Apparatus according to claim 22 wherein the validation rules comprise at least one of asset or serial number not found; serial number or serial number/model number are not unique; the account is not active; current meter date is not a valid date; current meter date is more than 30 days ago; current meter date is less than previous meter date; current meter date must be within 2-5 days of the "expected" meter date; invalid current meter reading; current meter reading less than previous meter reading; dealer provide meter credits; calculated overage charges by dealer does not equal preset amount; excess amount is greater than $1500; if consolidated account, all assets readings not received in file; duplicate readings. Each data record that passes all validation rules is then processed in the mainframe system for invoicing the lessee for the service payment.

25. Apparatus according to claim 22 wherein said means for generating an error report comprises means automatically correcting the data records identified as processing errors.

26. Apparatus according to claim 22 further comprising means for automatically providing a data file including the data records identified as input errors to a dealer for correction.

27. Apparatus according to claim 22 further comprising:

means for generating invoices related to equipment usage;

means for applying received payment to open invoices; and means for creating a payables data file, said file comprising at least one of check number, check amount, payment detail by asset, service payment breakdown by base service and overage charges, dealer invoice number and customer name.

28. Apparatus according to claim 27 wherein said payable file further includes a header record that identifies which data elements should be used by OMD Task 1Y to match the data in the payable data file to the dealer's payable data in the OMD software.

29. A computer program embodied on a computer-readable medium executable by a computer for performing usage-based billing for a business entity having customers subscribing to a usage-based billing program, said program comprising at least one code segment that:

receives meter data relating to equipment usage by one of the customers, the meter data including at least one of an amount of usage of a piece of equipment, equipment serial number, model number, meter reading date, and customer name;

generates an export file by processing the meter data, the export file including a plurality of data records;

stores the export file within a database;

applies validation rules to the export file to determine the data records included within the export file that satisfy the validation rules, wherein one of the applied validation rules determines whether data representing an amount of usage of a piece of equipment included within the corresponding export file is invalid;

generates an error report identifying the data records included within the export file that violate at least one of the validation rules including identifying data records that violate at least one of the validation rules due to at least one of a processing error and an inputting error;

generates a correction report including a list of all the data records listed on the error report, a corresponding reason for the data record to be listed on the error report, and a list of possible corrective actions to correct the data record for satisfying the validation rules;

prompts a user associated with the business entity to correct each data record listed on the error report such that each data record listed on the error report satisfies the validation rules;

generates a corrected export file including the corrected data records; and transmits an invoice for payment by the customer for usage of the piece of equipment based on the corrected export file.

30. A computer program according to claim 29 further comprising at least one code segment that automatically corrects the data records identified as processing errors.

31. A computer program according to claim 29 further comprising at least one code segment that automatically provides a data file including the data records identified as input errors to a dealer for correction.

32. A computer program according to claim 29 further comprising at least one code segment that:

generates invoices related to equipment usage;

applies received payment to open invoices; and creates a payables data file, said file comprising at least one of check number, check amount, payment detail by asset, service payment breakdown by base service and overage charges, dealer invoice number and customer name.

33. A method for performing usage-based billing for a business entity using a local computer system coupled to a database and a remote computer system, the business entity having customers subscribing to a usage-based billing program, said method comprising the steps of:

receiving at the remote computer system meter data relating to equipment usage by one of the customers, the meter data including at least one of an amount of usage of a piece of equipment, equipment serial number, model number, meter reading date, and customer name;

generating an export file by processing the meter data at the remote computer system, the export file including a plurality of data records;

transmitting the export file from the remote computer system to the local computer system for storing within the database;

applying validation rules to the export file at the local computer system to determine the data records included within the export file that satisfy the validation rules, wherein one of the applied validation rules determines whether data representing an amount of usage of a piece of equipment included within the corresponding export file is invalid;

generating an error report identifying the data records included within the export file that violate at least one of the validation rules including identifying data records that violate at least one of the validation rules due to at least one of a processing error at the local computer system and an receiving error at the remote computer system;

generating a correction report including a list of all the data records listed on the error report, a corresponding reason for the data record to be listed on the error report, and a list of possible corrective actions to correct the data record for satisfying the validation rules;

prompting a user associated with the business entity to correct each data record listed on the error report such that each data record listed on the error report satisfies the validation rules;

generating a corrected export file including the corrected data records; and transmitting an invoice for payment by the customer for usage of the piece of equipment based on the corrected export file.

34. A method according to claim 33 further comprising the step of generating a meter correction report identifying the data that violates a validation rule.

35. A method according to claim 34 further comprising the step of receiving an updated meter correction report, and applying corrections contained in the updated report to data stored in the database.

36. A method according to claim 35 further comprising the step of applying validation rules to data contained in the updated meter correction report.

* * * * *

UNITED STATES PATENT AND TRADEMARK OFFICE
CERTIFICATE OF CORRECTION

| | | |
|---|---|---|
| PATENT NO. | : 7,346,565 B2 | Page 1 of 1 |
| APPLICATION NO. | : 09/681391 | |
| DATED | : March 18, 2008 | |
| INVENTOR(S) | : Byrne et al. | |

It is certified that error appears in the above-identified patent and that said Letters Patent is hereby corrected as shown below:

Column 4, line 58, delete "assignedcurrent Meter" and insert therefor -- assignedCurrent Meter --.

Claim 19, column 11, line 48, delete "sewer" and insert therefor -- server --.

Signed and Sealed this

Twenty-sixth Day of May, 2009

JOHN DOLL
*Acting Director of the United States Patent and Trademark Office*